May 14, 1940.  R. S. FOX  2,200,880
MANUALLY OPERATED THICKNESS GAUGE
Filed Jan. 28, 1938  2 Sheets-Sheet 1
Fig.1
Fig.1a
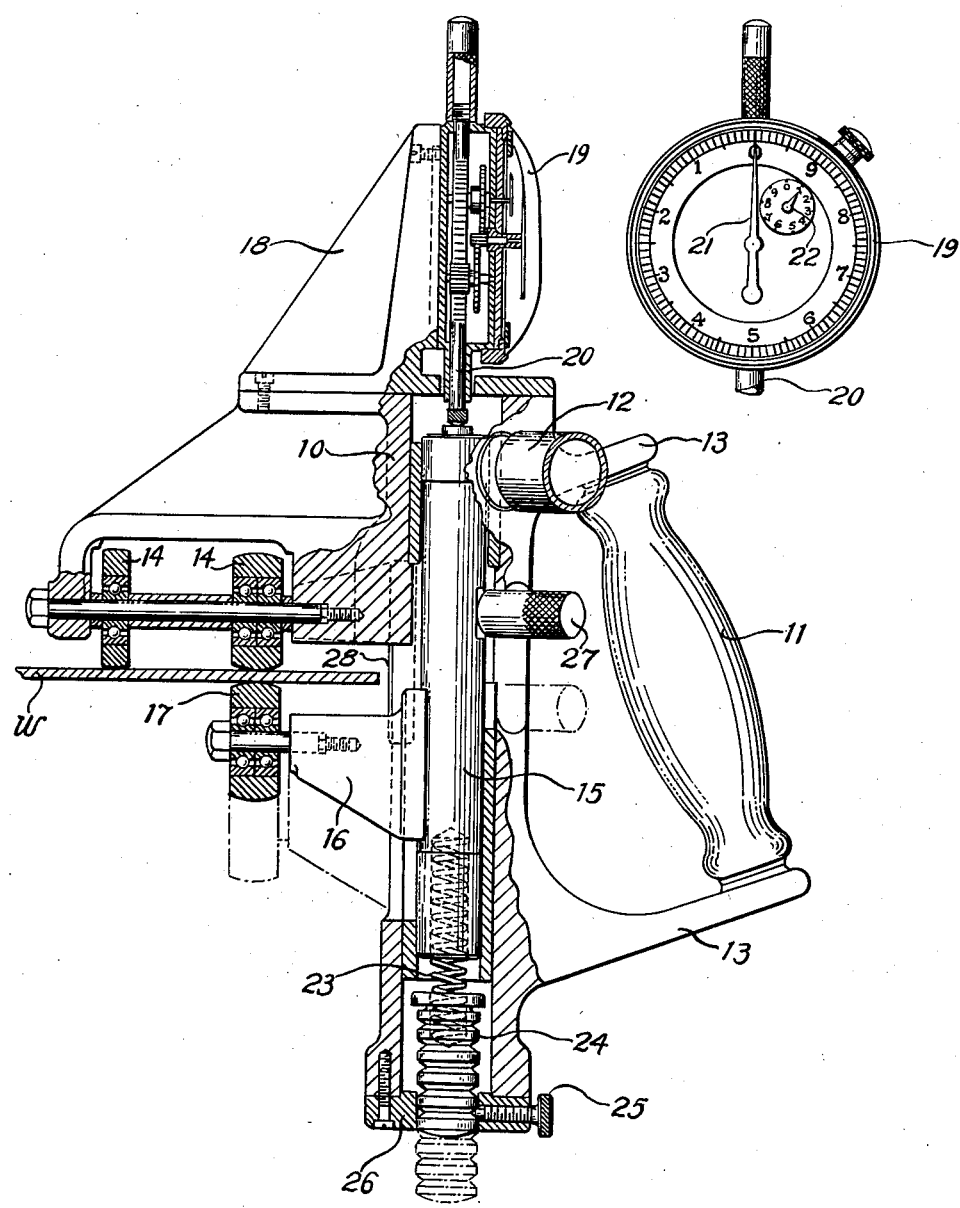
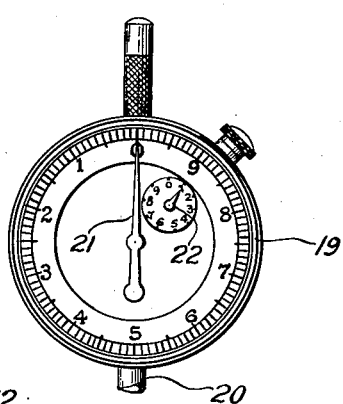
INVENTOR
R. S. Fox.
BY Joseph K. Schofield
ATTORNEY May 14, 1940.　　　R. S. FOX　　　2,200,880
MANUALLY OPERATED THICKNESS GAUGE
Filed Jan. 28, 1938　　　2 Sheets-Sheet 2
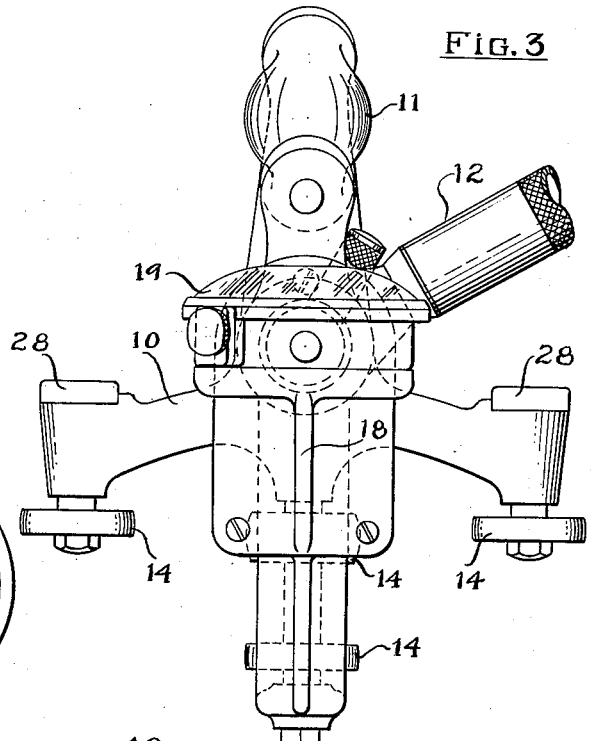
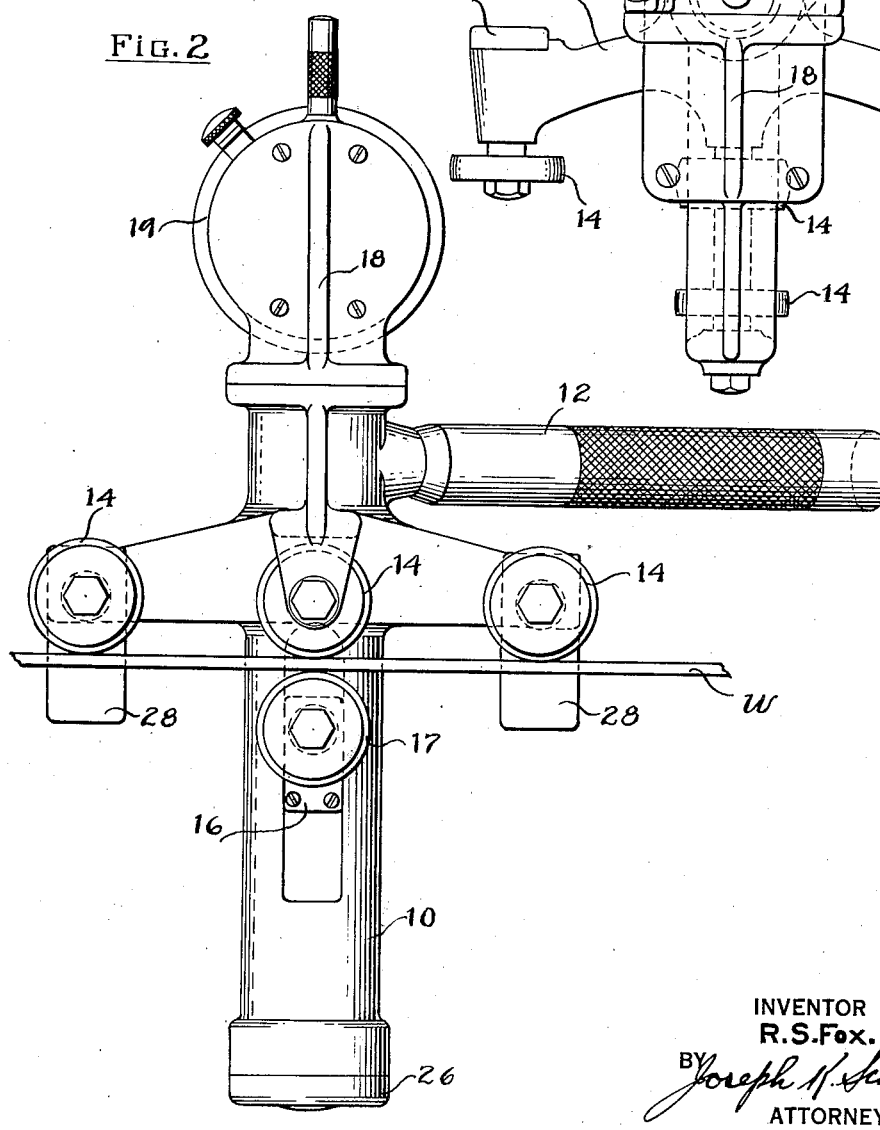
INVENTOR
R.S.Fox.
BY
ATTORNEY Patented May 14, 1940

2,200,880

UNITED STATES PATENT OFFICE 2,200,880

MANUALLY OPERATED THICKNESS GAUGE

Raymond S. Fox, Hartford, Conn., assignor to Niles-Bement-Pond Company, Hartford, Conn., a corporation of New Jersey Application January 28, 1938, Serial No. 187,469

2 Claims. (Cl. 33—147)

This invention relates to manually operated dimension gauges and particularly to a gauge for determining the thickness of metal strips or sheets.

An object of the present invention is to provide a simple and inexpensive gauging device for application to metal strips or sheets as they are being rolled; or which may be used by manually traversing the gauge adjacent and along the edges of a sheet or strip after it has been completely rolled or otherwise finished.

One feature which enables me to accomplish the above-named object is that there are a plurality of spaced rollers adapted to engage one surface of the sheet or strip being gauged, the contacting portions of each of these rollers or members being in a plane; there being a movable roller disposed directly opposite one of the first-mentioned rollers and movable directly toward and from that roller.

Another feature which is advantageous is that the movable roller is supported upon and movable with a vertically disposed plunger or bar within the body portion of the gauge, movements of this plunger serving to operate the movable spindle of a dial indicator.

Another feature of advantage is that manual means are disposed to move the plunger in a direction to separate the movable roller from the fixed roller and to provide resilient means, adjustable to predetermined pressures, normally forcing the movable roller toward the opposite fixed roller.

And finally it is a feature of the invention to provide angularly disposed handle portions which may be grasped one in each hand of the user and which will support the gauge in convenient position for operation.

With the above and other objects in view, the invention includes the features of construction and operation set forth in the following specification and illustrated in the accompanying drawings.

In the accompanying drawings annexed hereto and forming a part of this specification, I have shown the invention embodied in a simple manually operated device for traversing along the edge of a strip or sheet of relatively thin metal, but it will be understood that the invention can be otherwise embodied and that the drawings are not to be construed as defining or limiting the scope of the invention, the claims appended to this specification being relied upon for that purpose.

In the drawings:

Figure 1 is a view in elevation of a complete gauge made according to the present invention, some of the parts being broken away to more clearly show its construction.

Fig. 1ª is a front elevation of a dial indicator which may be used with the gauge.

Fig. 2 is a view in elevation of the gauge taken at right angles to the view shown in Fig. 1, and Fig. 3 is a plan view of the complete gauge shown apart from the material being gauged.

In the above-mentioned drawings there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a body member having spaced apart and angularly disposed handles for grasping the body member and for retaining the gauge in position for operation; second, a plurality of rotatable members or rollers suitably spaced apart and adapted to engage one surface of the strip or sheet being gauged, each roller having its contacting portion in a common plane; third, a plunger movable within the body member having a roller movable therewith adapted to engage the opposite surface of the material being gaged and movable directly toward and from one of the first-mentioned rollers; fourth, an indicator mounted upon the upper portion of the body member and having its movable spindle contacting with the upper end of the plunger; fifth, a handle outstanding from the plunger and adapted to be manually moved in a direction to separate the opposed rollers one from the other; and sixth, a spring normally forcing the plunger in a direction to bring the movable roller toward its opposed fixed roller.

Referring more in detail to the figures of the drawings, I provide a body member 10 having two handles 11 and 12, one of which, 11, is disposed at an oblique angle to the body member and supported at opposite ends by means of integral extensions 13 on the body member. The other handle 12 may preferably be in the form of a horizontal rod extending laterally from the body member 10 and disposed angularly with respect to the first-mentioned handle 11. By means of these handles a user is enabled to conveniently position the gauge over the edge of a strip or sheet of metal being gauged.

Rotatably mounted on this body member 10 are a plurality of rollers 14 preferably mounted upon suitable anti-friction bearings and having their axes in fixed positions. Two of these rollers 14, as shown in Fig. 1, may be mounted upon the same axis and other or supplemental rollers may be mounted for rotation upon laterally disposed axes on either side of the axis of the two coaxial rollers. In order to mount the rollers in spaced relation to each other integral bracket portions are formed on the body member. As shown in the drawings, each of these rollers is of substantially equal diameter and one is of materially greater width or thickness. The portions of each of these rollers 14 adapted to engage the strip or sheet W being gauged are carefully adjusted so that they all lie within a common plane.

Mounted for movement within the body member 10 in a direction normal to the plane of the rollers 14 referred to above is a plunger 15 having an arm 16 laterally outstanding therefrom and carrying a roller 17 thereon adapted to contact with the opposite side of the material from that engaged by the rollers 14. This roller, as shown in Figs. 1 and 2, is directly opposite one of the rollers 14 engaging the upper side of the material being gauged and is movable directly toward and from this roller. Preferably the roller 17 and the roller 14 directly opposed thereto are made of greater width and are used to determine the thickness of the material being gauged by determining their distance apart. The roller 17 moves directly toward and from its opposed roller 14 and in a direction normal to the plane of the contacting portions of the rollers 14.

Upon the upper portion of the body member 14 is mounted a bracket 18 on which is mounted a standard or usual form of dial indicator 19 having a vertically movable spindle 20 the lower end of which engages the upper end of the plunger 15 within the body member 10. This dial indicator 19 carries movable pointers such as 21 and 22 the movement of which is greatly increased relative to the movement of the spindle 20 and indicates the position of the plunger 15 and the movable roller 17 carried thereby.

Normally forcing the plunger 15 in a direction to cause the movable roller 17 to contact with its opposed roller 14 is a helical spring 23 partially housed within a recess provided within the lower end of the plunger. In order to vary the pressure exerted by this spring 23 upon its plunger a member 24 engaging the opposite or free end of the spring 23 is adjustably mounted within the lower end of the body portion 10. Preferably and as shown, this latter member 24 has a plurality of angular grooves any one of which may be engaged by a laterally disposed screw 25 movable radially within a plate 26 secured to the lower end of the body member.

At an intermediate point of the plunger 15 there is provided a laterally disposed stud or handle 27 positioned adjacent handles 11 and 12 for convenient operation to depress the plunger 15 and therefore separate the roller 17 from its opposed roller 14 to permit the gage to be positioned over the material being gauged.

In operation the gauge is first adjusted so that when the two opposed rollers 14 and 17 are in contact the pointers 21 and 22 of the dial indicator 19 will indicate zero. The instrument so adjusted is then positioned over one edge of the strip or sheet W being gauged by first depressing the stud 27 to separate the rollers 14 and 17 and then allowing spring 23 to force the plunger 15 upward to properly position the movable roller 17 firmly against the lower surface of the work. The body member 10 is positioned properly for gauging operation by reason of each of the rollers 14 having its material engaging portion in a common plane and resting on the material being gauged. Movement of the roller 17 is therefore normal to the plane of the strip or sheet being gauged during the gauging operation. To prevent the edge of the strip or sheet W coming into contact with portions of the body member 10 there may be provided abutments or bearing strips 28 formed on or attached to portions of the member 10.

What I claim is:

1. A thickness gauge for metal sheets comprising in combination, a body member, a pair of spaced rollers mounted therein rotatable upon a common fixed axis and adapted to engage one surface of the material being gauged, a roller mounted for movement toward and from one of said fixed rollers and engaging the opposite surface of the metal being gauged, indicating means whereby the position of said movable roller may be determined, supplementary guiding rollers on opposite sides of the axis of said pair of spaced rollers and engaging the material being gauged on the same side therewith, said spaced rollers and supplementary rollers having their material engaging portions in a common plane, and handles on said body member.

2. A thickness gauge for metal sheets comprising in combination, a body member, a pair of spaced rollers mounted therein rotatable upon a common fixed axis and adapted to engage one surface of the material being gauged, a roller mounted for movement toward and from one of said fixed rollers and engaging the opposite surface of the metal being gauged, indicating means whereby the position of said movable roller may be determined, supplementary guiding rollers on said body member engaging the material being gauged on the same side thereof as said fixed rollers, said pair of spaced rollers and said supplementary guiding rollers retaining said body member in position whereby the direction of movement of said movable roller will be normal to the plane of said material, and handles on said body member.

RAYMOND S. FOX.